(12) United States Patent
Hu et al.

(10) Patent No.: US 11,474,321 B2
(45) Date of Patent: Oct. 18, 2022

(54) OPTICAL MEMBER DRIVING MECHANISM

(71) Applicant: TDK TAIWAN CORP., Yangmei Taoyuan (TW)

(72) Inventors: Chao-Chang Hu, Yangmei Taoyuan (TW); Chen-Hsien Fan, Yangmei Taoyuan (TW)

(73) Assignee: TDK TAIWAN CORP., Yangmei Taoyuan (TW)

( * ) Notice: Subject to any disclaimer, the term of this patent is extended or adjusted under 35 U.S.C. 154(b) by 349 days.

(21) Appl. No.: 16/690,968

(22) Filed: Nov. 21, 2019

(65) Prior Publication Data
US 2020/0088970 A1 Mar. 19, 2020

Related U.S. Application Data

(63) Continuation of application No. 15/710,029, filed on Sep. 20, 2017, now Pat. No. 10,520,697.
(Continued)

(30) Foreign Application Priority Data

Jul. 20, 2017 (CN) .......................... 201710597664.4

(51) Int. Cl.
*G02B 7/02* (2021.01)
*G02B 13/00* (2006.01)
(Continued)

(52) U.S. Cl.
CPC .............. *G02B 7/02* (2013.01); *G02B 7/021* (2013.01); *G02B 7/08* (2013.01); *G02B 13/003* (2013.01);
(Continued)

(58) Field of Classification Search
CPC ...... G02B 27/646; G02B 7/08; G02B 15/173; G02B 15/14; G02B 15/177; G02B 15/22; G02B 15/16; G02B 13/18; G02B 13/009; G02B 27/64; G02B 7/09; G02B 13/02; G02B 7/04; G02B 13/0015; G02B 15/15; G02B 13/0045; G02B 15/17; G02B 15/20; G02B 27/0025; G02B 9/62; G02B 13/04; G02B 7/023; G02B 9/64; G02B 13/001; G02B 13/0065; G02B 15/10; G02B 15/163; G02B 15/167; G02B 23/02; G02B 7/02; G02B 7/022; G02B 7/102; G02B 7/14;
(Continued)

(56) References Cited

U.S. PATENT DOCUMENTS 6,266,486 B1 7/2001 Kohno
7,203,011 B2 4/2007 Ito et al.
(Continued)

FOREIGN PATENT DOCUMENTS

CN 105744131 B * 7/2019 ........... H04N 5/2253

*Primary Examiner* — Darryl J Collins
*Assistant Examiner* — Tamara Y. Washington
(74) *Attorney, Agent, or Firm* — Muncy, Geissler, Olds & Lowe, P.C.

(57) ABSTRACT

A camera device is provided, including a first lens unit, a second lens unit, a frame, a base, a plurality of suspension wires, and an electromagnetic driving mechanism. The frame surrounds the first lens unit and the second lens unit. The suspension wires are connected to the base and the frame. The electromagnetic driving mechanism can drive the frame to move along a first direction relative to the base.

7 Claims, 14 Drawing Sheets

Related U.S. Application Data

(60) Provisional application No. 62/402,100, filed on Sep. 30, 2016.

(51) Int. Cl.
| | | |
|---|---|---|
| *G03B 17/12* | (2021.01) | |
| *G02B 26/08* | (2006.01) | |
| *G03B 3/10* | (2021.01) | |
| *G02B 7/08* | (2021.01) | |
| *G02B 7/04* | (2021.01) | |
| *G06F 1/16* | (2006.01) | |
| *G03B 35/08* | (2021.01) | |

(52) U.S. Cl.
CPC ............ *G02B 26/085* (2013.01); *G03B 3/10* (2013.01); *G03B 17/12* (2013.01); *G02B 7/04* (2013.01); *G03B 35/08* (2013.01); *G03B 2205/0046* (2013.01); *G06F 1/1686* (2013.01)

(58) Field of Classification Search
CPC ... G02B 9/04; G02B 9/34; G02B 9/60; G02B 13/002; G02B 13/004; G02B 13/06; G02B 13/16; G02B 15/12; G02B 15/161; G02B 17/08; G02B 17/0804; G02B 17/0808; G02B 17/0896; G02B 21/26; G02B 26/004; G02B 26/0808; G02B 26/0816; G02B 27/0911; G02B 27/644; G02B 3/14; G02B 7/021; G02B 7/025; G02B 7/18; G02B 7/24; G02B 7/28; G02B 9/00; G02B 9/24; H04N 5/23287; H04N 5/2254; H04N 5/2329; H04N 5/2257; H04N 5/2253; H04N 5/23248; H04N 5/2328; H04N 5/225; H04N 5/232; H04N 5/23209; H04N 5/23212; H04N 5/23245; H04N 5/23258; H04N 5/23264; H04N 13/0203; H04N 13/0239; H04N 13/0296; H04N 5/222; H04N 5/228; H04N 5/23229; H04N 5/23251; H04N 5/23254; H04N 5/23261; H04N 5/238; G03B 5/00; G03B 2205/0015; G03B 3/10; G03B 2205/0069; G03B 2205/002; G03B 2205/0007; G03B 13/36; G03B 17/02; G03B 17/04; G03B 17/14; G03B 17/12; G03B 2205/0046; G03B 2205/0053; G03B 2205/0092; G03B 3/00; G03B 5/02; G03B 5/06

See application file for complete search history.

(56) References Cited

U.S. PATENT DOCUMENTS

| | | |
|---|---|---|
| 7,983,545 B2 | 7/2011 | Maeda et al. |
| 10,027,870 B2 | 7/2018 | Hsu et al. |
| 10,085,009 B2 | 9/2018 | Hsu et al. |
| 2012/0154614 A1 | 6/2012 | Moriya et al. |
| 2013/0258475 A1 | 10/2013 | Lee |
| 2014/0333784 A1 | 11/2014 | Hu et al. |
| 2017/0315376 A1 | 11/2017 | Hu |
| 2017/0324906 A1* | 11/2017 | Kang ................. G02B 7/28 |
| 2018/0196218 A1 | 7/2018 | Kao et al. |
| 2018/0210317 A1 | 7/2018 | Hu et al. |

\* cited by examiner

OPTICAL MEMBER DRIVING MECHANISM

CROSS REFERENCE TO RELATED APPLICATIONS

This application is a Continuation of application Ser. No. 15/710,029, filed on Sep. 20, 2017, which claims the benefit of U.S. Provisional Application No. 62/402,100, filed Sep. 30, 2016, and China Patent Application No. 201710597664.4, filed Jul. 20, 2017.

BACKGROUND OF THE INVENTION

Field of the Invention

The application relates in general to a camera module, and in particular, to a camera module having two lens units.

Description of the Related Art

As technology has advanced, a lot of electronic devices (for example, cameras and smartphones) have been given the functionality of taking photographs and recording video. These electronic devices have become more commonplace, and have been developed to be more convenient and thin. More and more choices are provided for users to choose from.

Generally, an electronic device having the functionality of taking photographs or recording video includes a driving module to drive one or more lenses to move along an optical axis, so as to facilitate auto-focus and auto-zoom controls. The light can pass through the lenses and form an image on an image sensor.

However, when the electronic device has a plurality of lenses, the same amount of driving modules as the lenses are usually disposed around the lenses. The distance between the lenses is therefore increased, and the image generated by the electronic device may become distorted in post-processing. Therefore, how to address the aforementioned problem has become an important issue.

BRIEF SUMMARY OF INVENTION

To address the deficiencies of conventional products, an embodiment of the invention provides a camera device, including a first lens unit, a second lens unit, a frame, a base, a plurality of suspension wires, and an electromagnetic driving mechanism. The frame surrounds the first lens unit and the second lens unit. The suspension wires are connected to the base and the frame. The electromagnetic driving mechanism can drive the frame to move along a first direction relative to the base.

In some embodiments, the camera further comprises a focusing mechanism, driving the first lens unit and the second lens unit to individually move along a second direction relative to the base.

In some embodiments, the focusing mechanism comprises a first lens holder, a second lens holder, a first electromagnetic driving assembly disposed on the first lens holder, a second electromagnetic driving assembly disposed on the second lens holder, and an electromagnetic driving unit. The first lens unit is disposed on the first lens holder, and the second lens unit is disposed on the second lens holder. The electromagnetic driving unit is disposed on the frame and corresponds to the first electromagnetic driving assembly and the second electromagnetic driving assembly.

In some embodiments, the focusing mechanism further comprises a first elastic member. The first elastic member comprises a fixed portion connected to the frame, a first inner portion connected to the first lens holder, and a second inner portion connected to the second lens holder. The suspension wires are electrically connected to the first elastic member.

In some embodiments, the camera module further comprises a focusing mechanism, driving the first lens unit and the second lens unit to move simultaneously along a second direction relative to the base.

In some embodiments, the focusing mechanism comprises a lens holder, an electromagnetic driving assembly disposed on the lens holder, and an electromagnetic driving unit. The first lens unit and the second lens unit are disposed on the lens holder. The electromagnetic driving unit is disposed on the frame and corresponds to the electromagnetic driving assembly.

In some embodiments, the suspension wires are electrically connected to the focusing mechanism.

In some embodiments, the focusing mechanism further comprises a first elastic member connected to the frame and the lens holder, and the suspension wires are electrically connected to the first elastic member.

In some embodiments, the first direction is perpendicular to the second direction.

In some embodiments, the camera device further comprises a plurality of electromagnetic driving units disposed on the frame, and the electromagnetic mechanism comprises a plurality of driving coils disposed on the base, wherein the driving coils correspond to the electromagnetic driving unit.

In some embodiments, the camera device further comprises a plurality of detectors, disposed on the base and corresponding to the electromagnetic driving unit.

In some embodiments, the detectors are disposed between the first lens unit and the second lens unit.

In some embodiments, the camera device further comprises an OIS control member, disposed on the base.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The making and using of the embodiments of the camera module are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Figure 1:
FIG. 1 is a schematic diagram of an electronic device according to an embodiment of the invention.

Referring to FIG. 1, in an embodiment of the invention, the camera module 10 can be disposed in an electronic device 20 and used to take photographs or record video. The electronic device 20 can be a smartphone or a digital camera, for example. When taking photographs or recording video, the camera module 10 can receive the light and form an image, wherein the image can be transmitted to a processor (not shown) in the electronic device 20, where post-processing of the image can be performed.

Figure 2:
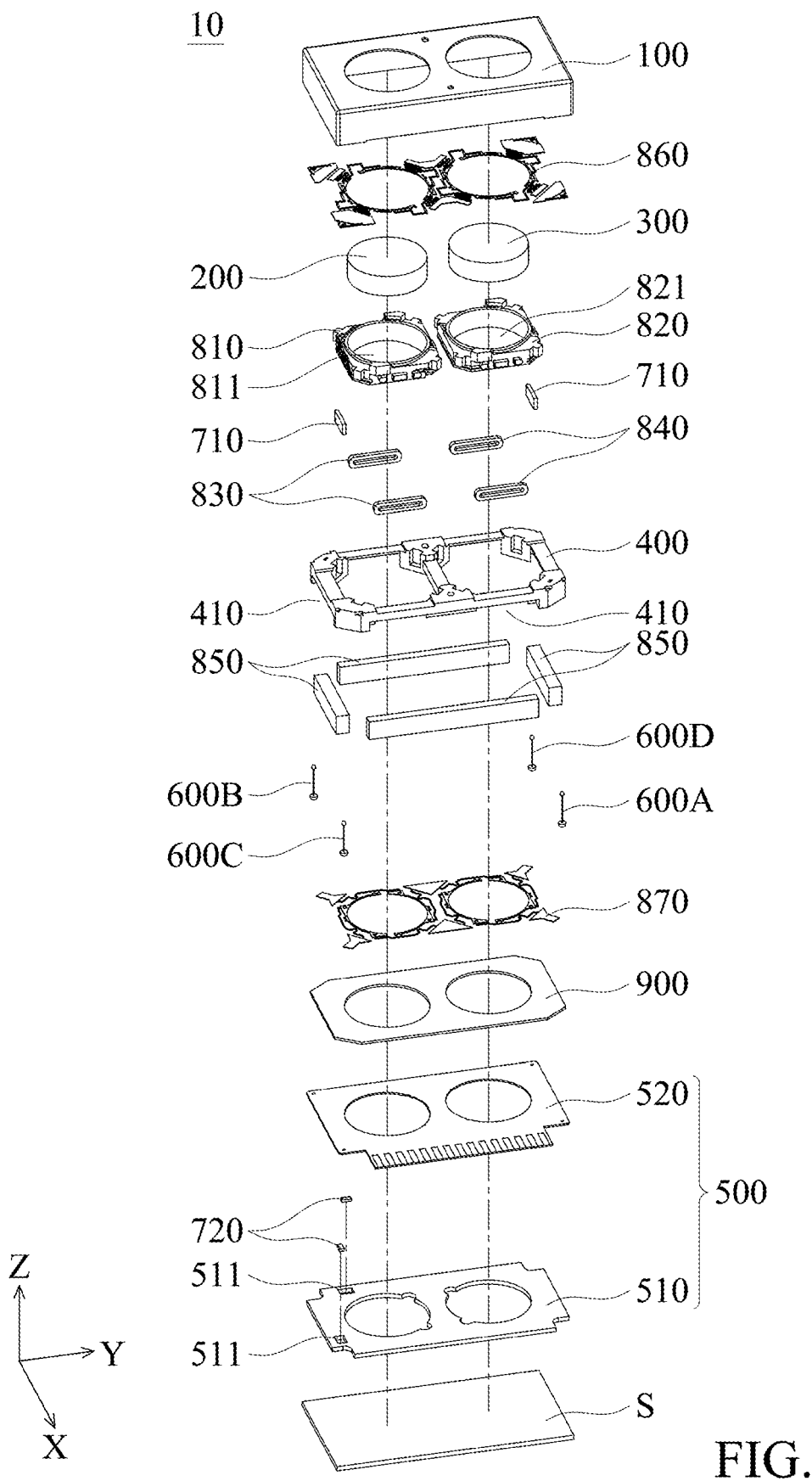
FIG. 2 is an exploded-view diagram of a camera module according to an embodiment of the invention.

As shown in FIG. 2, the camera module 10 comprises a housing 100, a first lens unit 200, a second lens unit 300, a frame 400, a base 500, a plurality of suspension wires 600A-600D, a plurality of detectors 710 and 720, a focusing mechanism, an electromagnetic driving mechanism, and an image sensor module S. The focusing mechanism comprises a first lens holder 810, a second lens holder 820, at least one first electromagnetic driving assembly 830, at least one second electromagnetic driving assembly 840, at least one electromagnetic driving unit 850, a first elastic member 860, and a second elastic member 870. The electromagnetic driving mechanism comprises a coil module 900.

An accommodating space 811 is for rued at the center of the first lens holder 810. The first lens unit 200 and the first electromagnetic driving assembly 830 are affixed to the first lens holder 810, and the first lens unit 200 is accommodated in the accommodating space 811. Similarly, an accommodating space 821 is formed at the center of the second lens holder 820. The second lens unit 300 and the second electromagnetic driving assembly 840 are affixed to the second lens holder 820, and the second lens unit 300 is accommodated in the accommodating space 821.

The frame 400 surrounds the first lens holder 810 and the first lens unit 200 disposed thereon, and the second lens holder 820 and the second lens unit 300 disposed thereon. The frame 400 has at least one recess 810 for receiving the electromagnetic driving unit 850. The electromagnetic unit 850 can be affixed in the recess 410, and correspond to the first electromagnetic driving assembly 830 on the first lens holder 810 and the second electromagnetic driving assembly 840 on the second lens holder 820. Therefore, the electromagnetic effect between the electromagnetic unit 850 and the first electromagnetic driving assembly 830 can drive the first lens unit 200 to move along the Z-axis (a second direction) relative to the base 500, and the electromagnetic effect between the electromagnetic unit 850 and the second electromagnetic driving assembly 840 can drive the second lens unit 300 to move along the Z-axis (a second direction) relative to the base 500, so as to achieve the purpose of focus adjustment.

For example, in this embodiment, the first electromagnetic driving assembly 830 and the second electromagnetic driving assembly 840 can be driving coils, and the electromagnetic driving unit 850 can comprise at least one magnet. When a current flows through the first electromagnetic driving assembly 830, the electromagnetic effect is generated between the first electromagnetic driving assembly 830 and the electromagnetic driving unit 850. Thus, the first lens holder 810 and the first lens unit 200 disposed thereon can be driven to move along the Z-axis relative to the frame 400, and to move along the Z-axis relative to the base 500 and the image sensor module S. When a current flows through the second electromagnetic driving assembly 840, the electromagnetic effect is generated between the second electromagnetic driving assembly 840 and the electromagnetic driving unit 850. Thus, the second lens holder 820 and the second lens unit 300 disposed thereon can be driven to move along the Z-axis relative to the frame 400, and to move along the Z-axis relative to the base 500 and the image sensor module S.

In some embodiments, the first electromagnetic driving assembly 830 and the second electromagnetic driving assembly 840 can be magnets, and the electromagnetic driving unit 850 can comprise be a driving coil.

It should be noted that, in this embodiment, the length of at least one electromagnetic driving unit 850 along the Y-axis is greater than the distance between the first electromagnetic driving assembly 830 and the second electromagnetic driving assembly 840. Therefore, this electromagnetic driving unit 850 can be used in the electromagnetic effects of movements of the first lens unit 200 and the second unit 300.

Figure 3A:
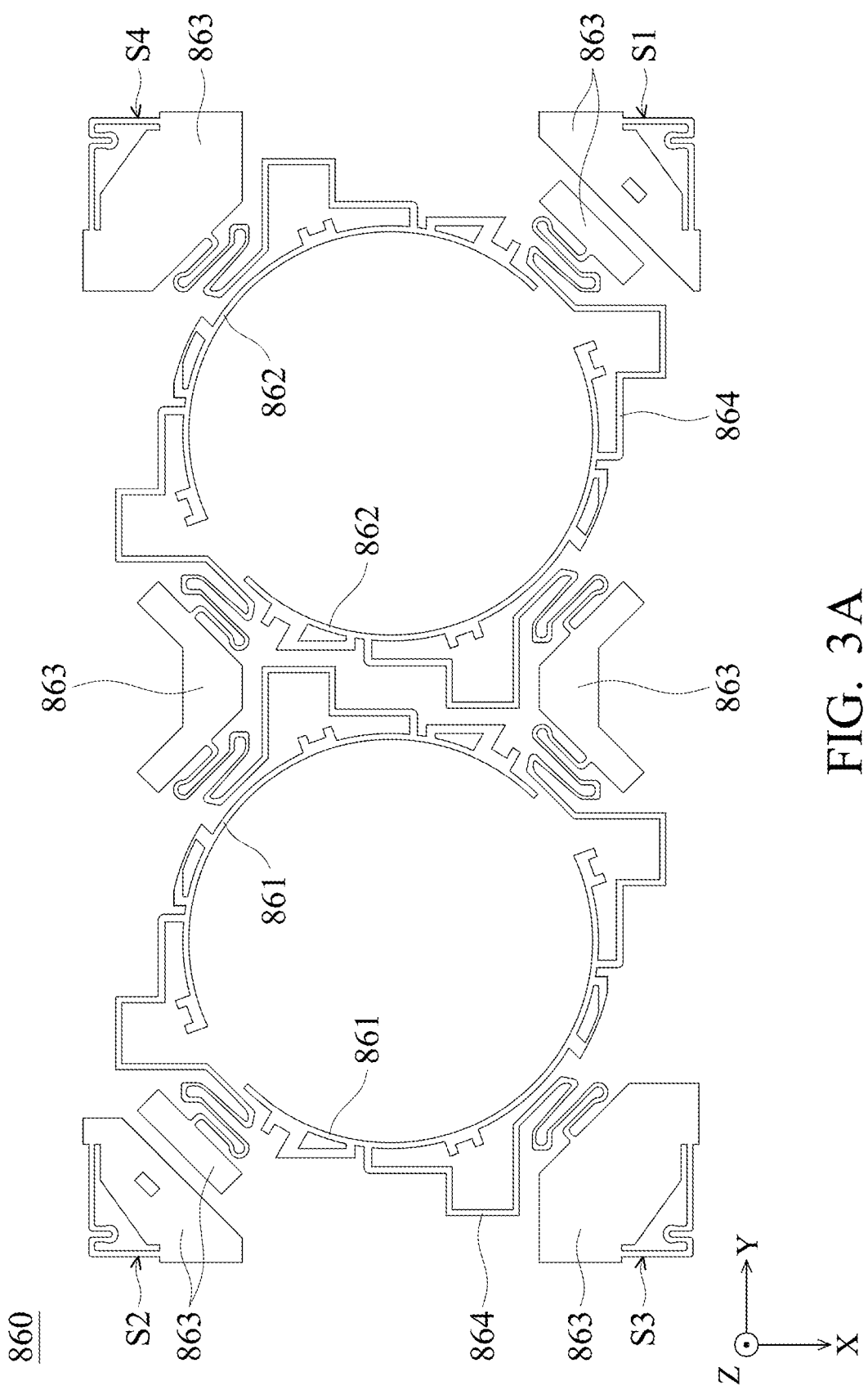
FIG. 3A is a schematic diagram of a first elastic member according to an embodiment of the invention.

Referring to FIG. 3A, the first elastic member 860 has a first inner portion 861, a second inner portion 862, a plurality of fixed portions 863, and a plurality of string portions 864. The first inner portion 861 and the second inner portion 862 are respectively affixed to the first lens holder 810 and the second lens holder 820. The fixed portions 863 are affixed to the frame 400. The string portions 864 connect the first inner portion 861 to the fixed portions 863, and connect the second inner portion 862 to the fixed portion 863.

In particular, in this embodiment, the first elastic member 860 has four segments S1, S2, S3, and S4 separated from each other. The segments S1 and S2 merely comprise the fixed portion 863. The segments S3 and S4 comprise the fixed portions 863, parts of the first inner portion 861, parts of the second inner portion 862, and the string portions 864 which are utilized to form connections.

Figure 3B:
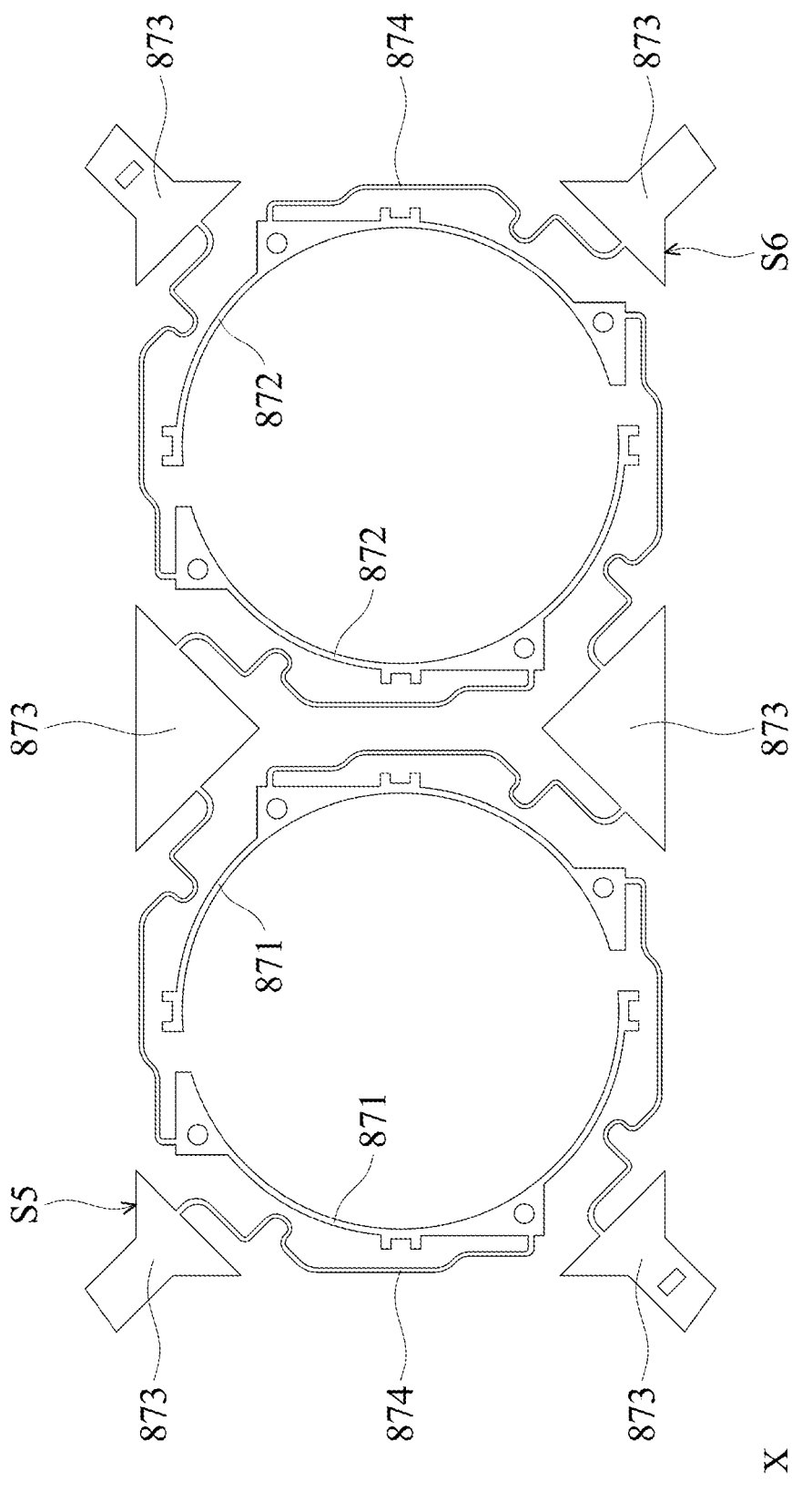
FIG. 3B is a schematic diagram of a second elastic member according to an embodiment of the invention.

Referring to FIG. 3B, similar to the first elastic member 860, the second elastic member 870 also comprises a first inner portion 871, a second inner portion 872, a plurality of fixed portions 873, and a plurality of string portions 874. The first inner portion 871 and the second inner portion 872 are respectively affixed to the first lens holder 810 and the second lens holder 820. The fixed portion 873 is affixed to the frame 400. The string portions 874 connect the first inner portion 871 to the fixed portions 873, and connect the second inner portion 872 to the fixed portions 873.

In this embodiment, the first elastic member 860 has two segments S5 and S6 separated from each other. The segments S5 and S6 comprise the fixed portions 873, parts of the first inner portion 871, parts of the second inner portion 872, and the string portions 874 which are utilized to form connections.

As shown in FIG. 2, the first elastic member 860 and the second elastic member 870 are disposed on the opposite sides of the frame 400. Thus, the first lens holder 810 and the second lens holder 820 can be hung by the elastic force of the first elastic member 860 and the second elastic member 870, and the range of motions of the first and second lens holders 810 and 820 along the Z-axis can also be restricted by the first and second elastic members 860 and 870.

The coil module 900 is disposed on the base 500. The base 500 comprises a substrate 510 and a flexible printed circuit board 520, wherein the flexible printed circuit board 520 is disposed between the substrate 510 and the coil module 900. The coil module 900 has a plurality of driving coils corresponding to the electromagnetic driving unit 850. When a current flows through the driving coils in the coil module 900, the electromagnetic effect is generated between the electromagnetic driving unit 850 and the coil module 900. The frame 400 and the first and second lens holders 810 and 820 disposed thereon can be driven to move along the X-axis and/or the Y-axis relative to the base 500, so as to achieve the purpose of image stabilization.

In this embodiment, the camera device 10 comprises four suspension wires 600A-600D respectively disposed on the four corners of the base 500 and connected to the flexible printed circuit board 520 and the first elastic member 860. When the frame 400 moves relative to the base 500 along the X-axis and/or the Y-axis, the suspension wires 600A-600D can restrict their range of motion. Moreover, since the suspension wires 600A-600D comprise metal (for example, copper or an alloy thereof), the suspension wires 600A-600D can be used as a conductor.

The detectors 710 are disposed on the first lens holder 810 and the second lens holder 820, and used to detect the relative position between the first lens holder 810 and the frame 400 and the relative position between the second lens holder 820 and the frame 400. The detectors 720 are connected to the flexible printed circuit board 520 and accommodated in the holes 511 of the base 510. The detectors 720 can determine the position of the first and second lens holder 810 and 820 in the X-axis and the Y-axis by detecting the movement of the electromagnetic unit 850.

For example, the detectors 710 and 720 can be a Hall sensor, a magnetoresistance effect sensor (MR sensor), a giant magnetoresistance effect sensor (GMR sensor), a tunneling magnetoresistance effect sensor (TMR sensor), or a fluxgate sensor.

In this embodiment, each of the detectors 710 is an all-in-one IC. Therefore, in addition to the aforementioned sensor, the detectors 710 further comprise a wire for inputting the control signal. Specifically, in this embodiment, two all-in-one ICs on the first and second lens holders 810 and 820 can transmit the control signal via the first elastic member 860, the second elastic member 870, the suspension wires 600A-600D, and the wires arranged on the first and second lens holders 810 and 820. The additional wires for transmitting the control signal can be omitted. The details of the transmitting method are described below.

The all-in-one IC has four pins for inputting the control signal. First, referring to FIGS. 4A and 4B, the first pin of the detector 710 on the first lens holder 810 connects to the lead 812 on the first lens holder 810. The lead 812 can be electrically connected to the segment S3 of the first elastic member 860 by a solder R1, and the segment S3 of the first elastic member 860 is electrically connected to the suspension wire 600C. Therefore, the first pin of the detector 710 can transmit the control signal to the flexible printed circuit board 520 through the suspension wire 600C.

Figure 4A:
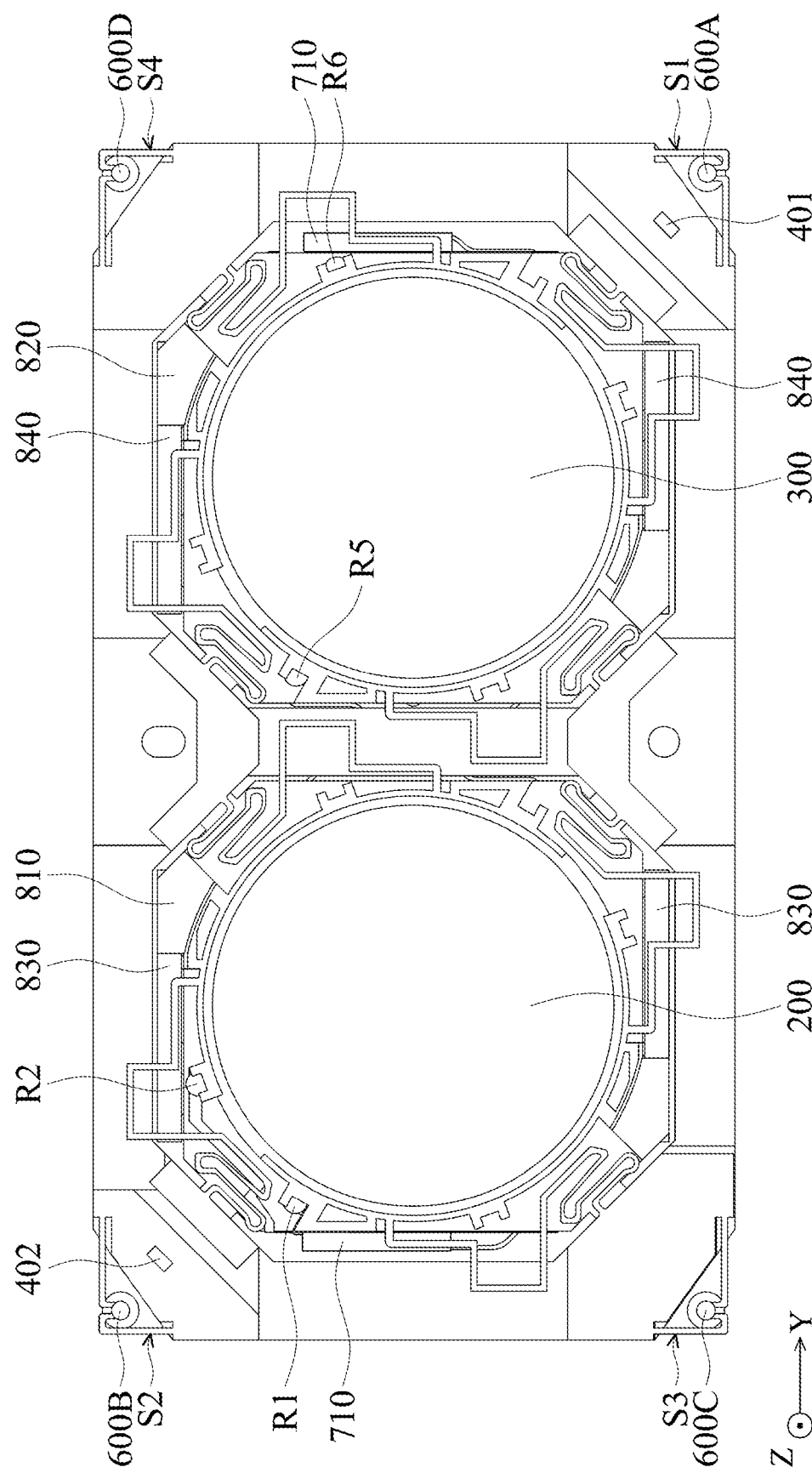
FIG. 4A is a schematic diagram of a first elastic member electrically connected to suspension wires according to an embodiment of the invention.
Figure 4B:
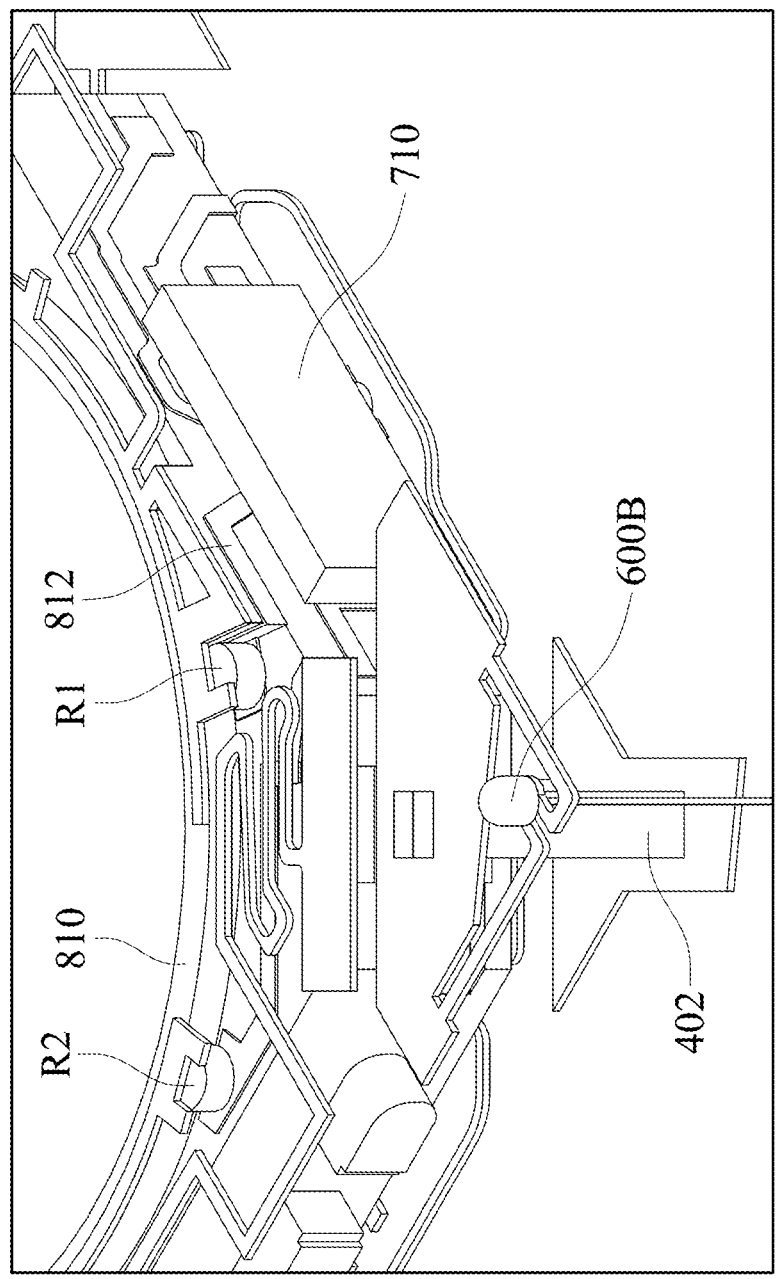
FIG. 4B is a schematic diagram of a detector electrically connected to a first elastic member according to an embodiment of the invention.
Figure 4C:
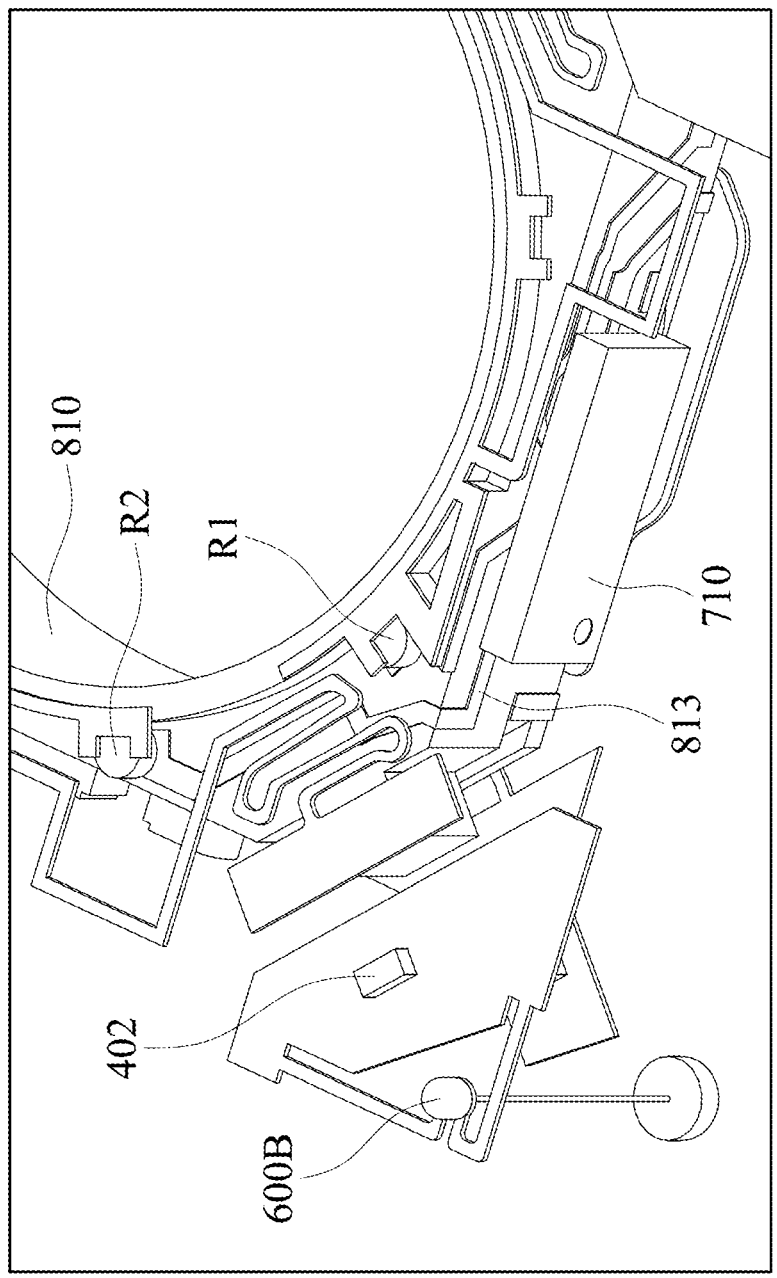
FIG. 4C is a schematic diagram of a detector electrically connected to a first elastic member according to an embodiment of the invention.

Second, referring to FIGS. 4A and 4C, the second pin of the detector 710 connects the lead 813 on the first lens holder 810. The lead 813 can be electrically connected to the segment S4 of the first elastic member 860 by a solder R2, and the segment S4 of the first elastic member 860 is electrically connected to the suspension wire 600D. Therefore, the second pin of the detector 710 can transmit the control signal to the flexible printed circuit board 520 through the suspension wire 600D.

Figure 4D:
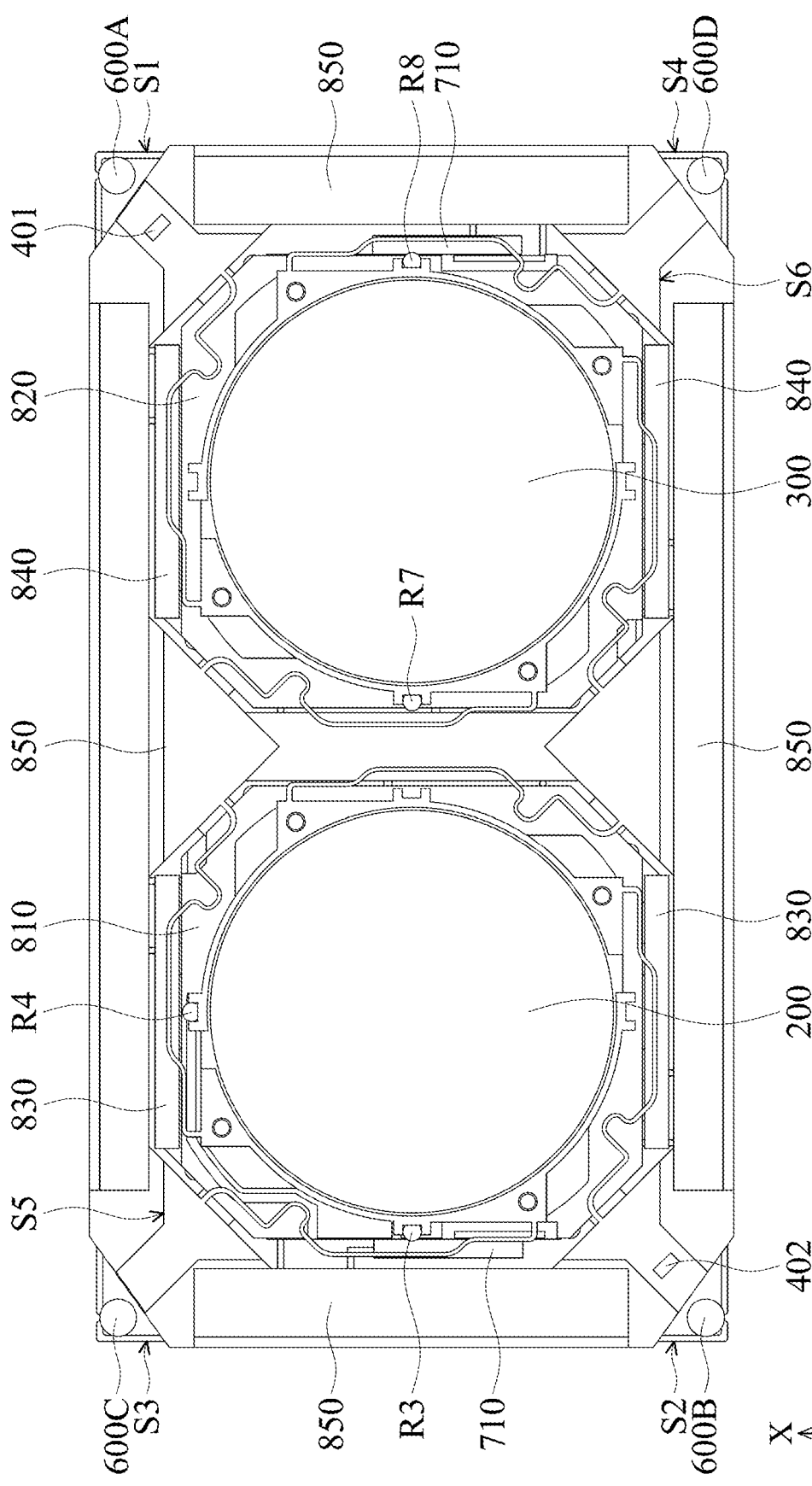
FIG. 4D is a schematic diagram of a second elastic member electrically connected to suspension wires according to an embodiment of the invention.
Figure 4E:
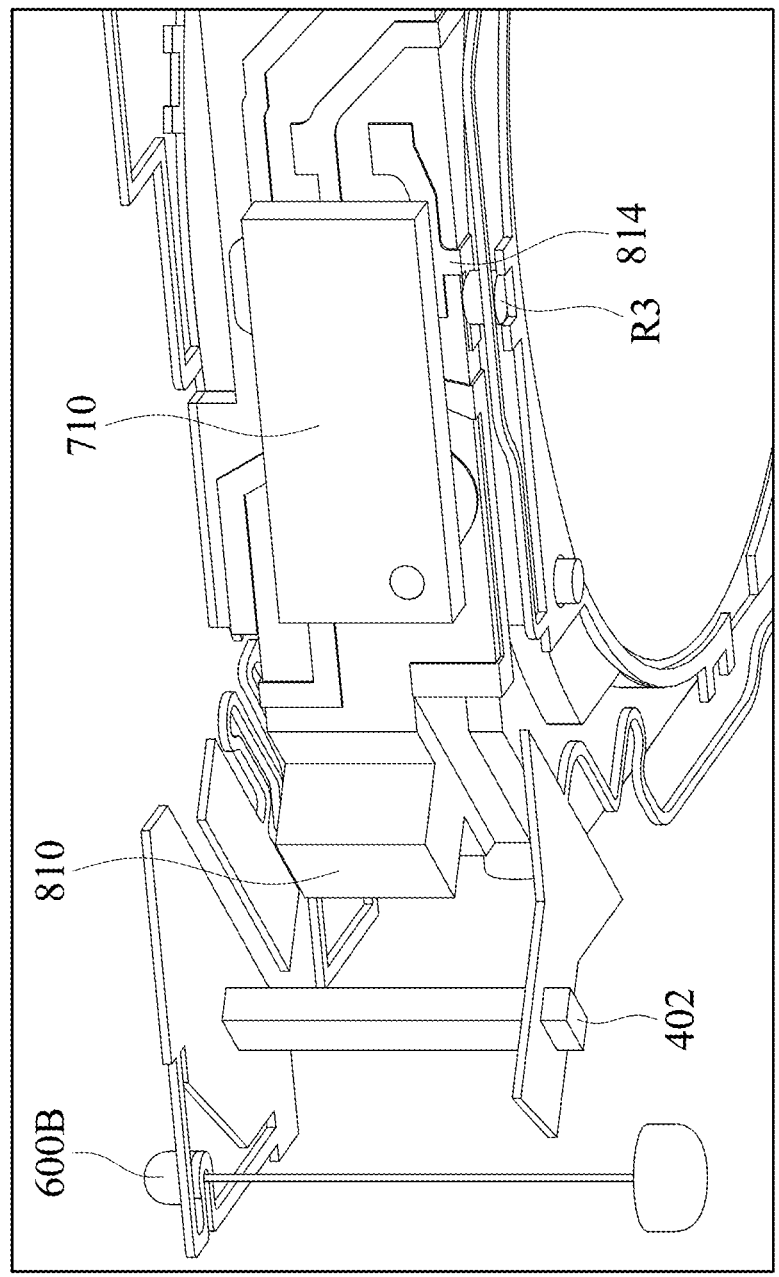
FIG. 4E is a schematic diagram of a detector electrically connected to a second elastic member according to an embodiment of the invention.
Figure 4F:
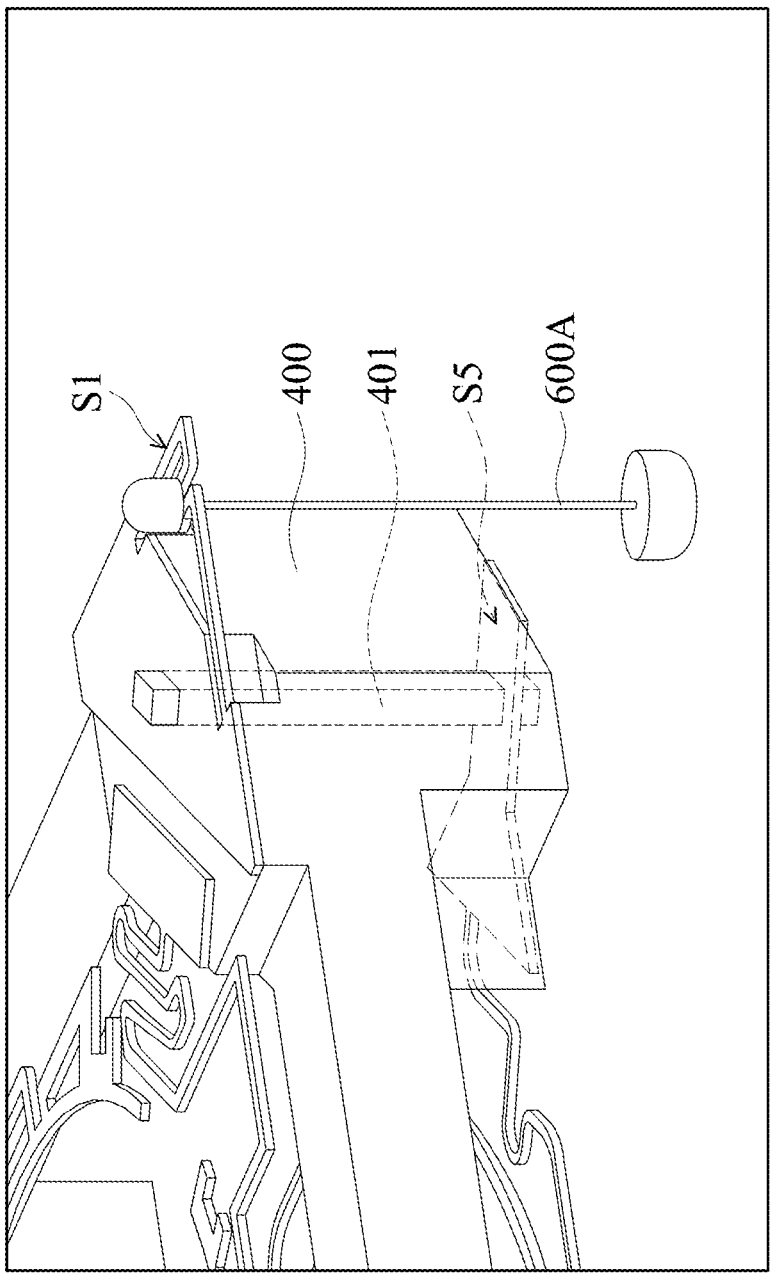
FIG. 4F is a schematic diagram of a wire embedded in a frame according to an embodiment of the invention.

Furthermore, as shown in FIGS. 4D-4F, the third pin of the detector 710 connects the lead 814 on the first lens holder 810. The lead 814 can be electrically connected to the segment S5 of the second elastic member 870 by a solder R3. The conductive line 401 on the frame 400 is electrically connected to the segment S5 of the second elastic member 870 and the segment S1 of the first elastic member 860, and the segment S1 of the first elastic member 860 is electrically connected to the suspension wire 600A. Therefore, the third pin of the detector 710 can transmit the control signal to the flexible printed circuit board 520 through the suspension wire 600A.

It should be noted that, as shown in FIG. 4F, the conductive line 401 in this embodiment is embedded in the frame 400. The short circuit between the wire 400 and the other wires due to contacting can be avoided.

Figure 4G:
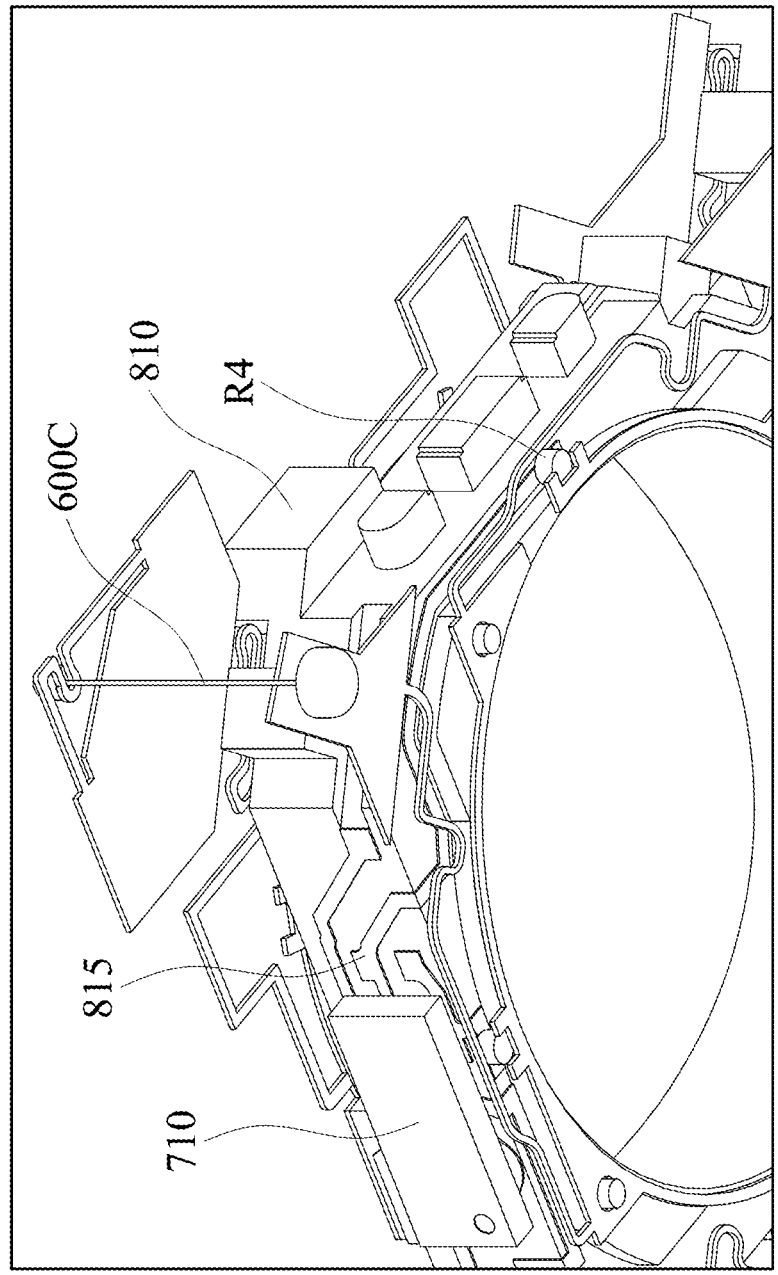
FIG. 4G is a schematic diagram of a detector electrically connected to a second elastic member according to an embodiment of the invention.

As shown in FIGS. 4D and 4G, the fourth pin of the detector 710 connects the lead 815 on the first lens holder 810. The lead 815 can be electrically connected to the segment S6 of the second elastic member 870 by a solder R4. A conductive line 402 on the frame 400 is electrically connected to the segment S6 of the second elastic member 870 and the segment S2 of the first elastic member 860, and the segment S2 of the first elastic member 860 is electrically connected to the suspension wire 600B. Therefore, the fourth pin of the detector 710 can transmit the control signal to the flexible printed circuit hoard 520 through the suspension wire 600B.

The aforementioned four pins of the detector 710 on the first lens holder 810 can input the control signal through the aforementioned path. Similarly, the first pin of the detector 710 on the second lens holder 820 can be electrically connected to the suspension wire 600C through the wire on the second lens holder 820, a solder R5, and the segment S3 of the first elastic member 860. The second pin of the detector 710 on the second lens holder 820 can be electrically connected to the suspension wire 600D through the wire on the second lens holder 820, a solder R6, and the segment S4 of the first elastic member 860. The third pin of the detector 710 on the second lens holder 820 can be electrically connected to the suspension wire 600A through the wire on the second lens holder 820, a solder R7, the segment S5 of the second elastic member 870, the conductive line 401 on the frame 400, and the segment S1 of the first elastic member 860. The fourth pin of the detector 710 on the second lens holder 820 can be electrically connected to the suspension wire 600B through the wire on the second lens holder 820, a solder R8, the segment S6 of the second elastic member 870, the conductive line 402 on the frame 400, and the segment S2 of the first elastic member 860.

In other words, both of the detectors 710 on the first and second lens holders can transmit control signal though the suspension wires 600A-600D, and the required number of the suspension wires can be reduced.

The leads (such as the leads 812-815) can be formed on the first lens holder 810 and the second lens holder 820 by using a molded interconnect device (MID), for example, by laser direct structuring (LDS), microscopic integrated processing technology (MIPTEC), laser induced metallization (LIM), laser restructuring print (LRP), an aerosol jet process, or a two-shot molding method.

In some embodiments, the user can merely dispose the detector 710 on the one lens holder. In some embodiments, the detectors 710 can be omitted. Furthermore, the focus length of the first lens unit 200 on the first lens holder 810 can be the same as or different from that of the second lens unit 200 on the second lens holder 820.

Comparing to the conventional camera device having dual lenses, the distance between the first lens unit 200 and the second lens unit 300 in the camera device 10 of the present application is smaller. Therefore, the images generated from the first lens unit 200 and the second lens unit 300 are similar, the processing time needed for the post-processing of the image can be reduced, and the quality of the image can be enhanced. Since there is no electromagnetic member disposed between the first lens unit 200 and the second lens unit 300, magnetic interference can be reduced. Furthermore, since the frame 400, the base 500, and the suspension wires 600 are used in the motion of both the first lens unit 200 and the second lens unit 300, deviation between the aforementioned members during assembly or movement can be reduced.

Figure 5:
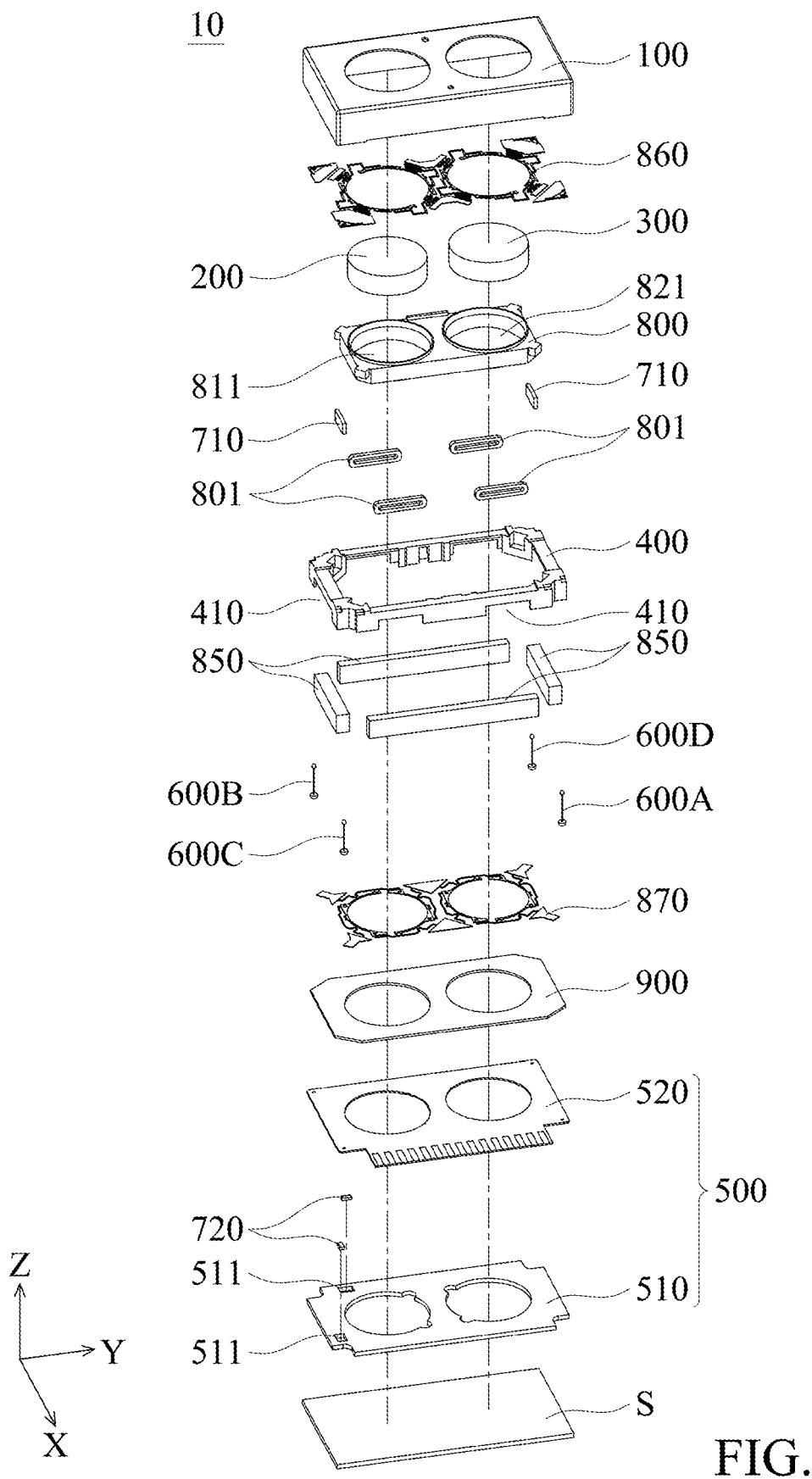
FIG. 5 is an exploded-view diagram of a camera device according to another embodiment of the invention.

Referring to FIG. 5, in another embodiment of the invention, the focusing mechanism of the camera device 10 comprises a lens holder 800, at least one electromagnetic driving assembly 801, at least one electromagnetic driving unit 850, a first elastic member 860, and a second elastic member 870. The first lens unit 200, the second lens unit 300, and the electromagnetic driving assembly 801 are affixed to the lens holder 800, and the first lens unit 200 and the second lens unit 30 are respectively accommodated in the accommodating spaces 811 and 821 of the lens holder 800. Moreover, the frame 400 surrounds the lens holder 800 and the first and second lens units 200 and 300 disposed thereon.

Since the first lens unit 200 and the second lens unit 300 are disposed on the same lens holder 800, they can simultaneously move along the Z-axis by the electromagnetic driving assembly 801 and the electromagnetic driving unit 850, the number of the electromagnetic members can be reduced.

Figure 6A:
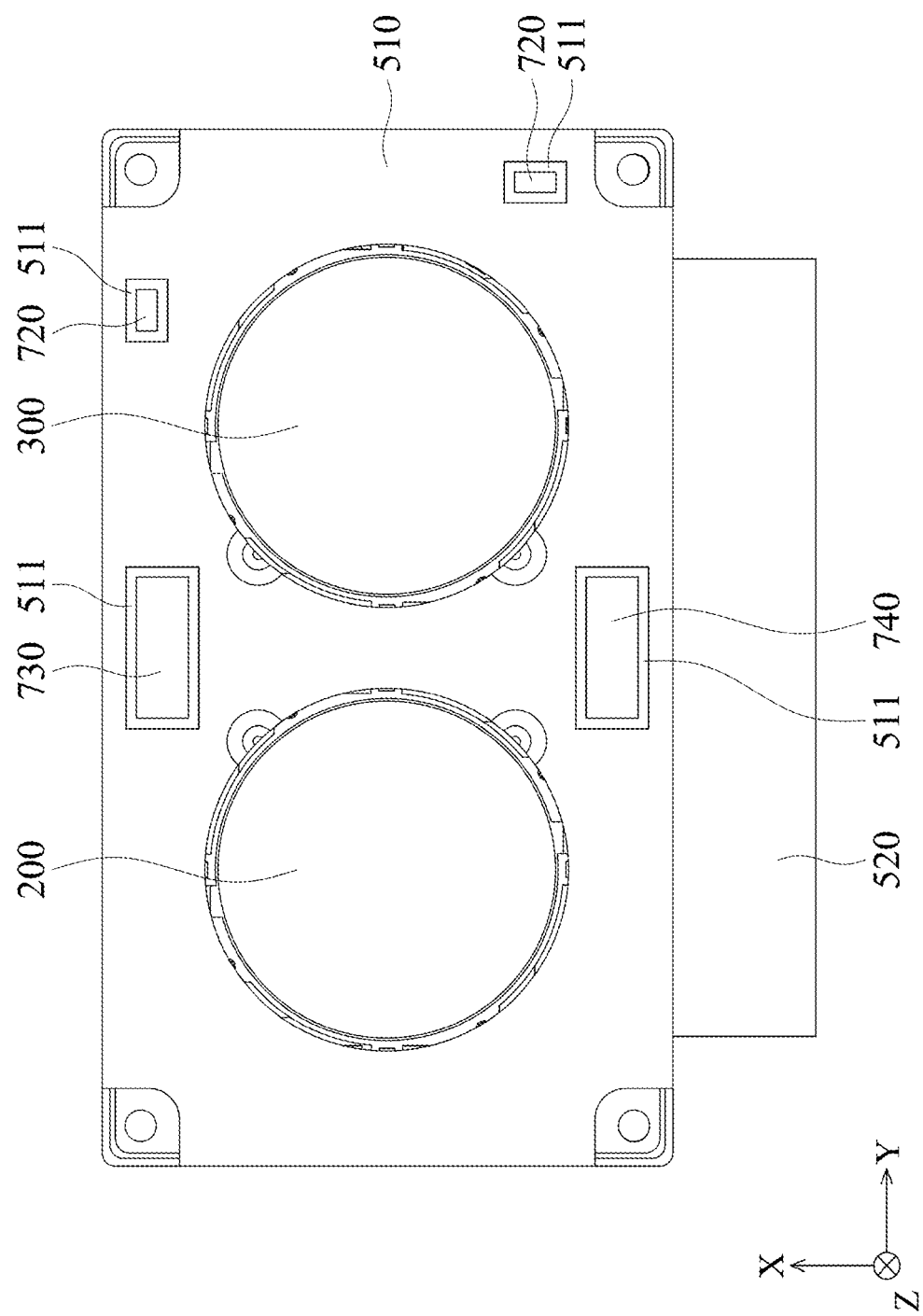
FIG. 6A is a schematic diagram of a camera device according to another embodiment of the invention.

As shown in FIG. 6A, in some embodiments, the camera device 10 further comprises an OIS control member 730 and a gyroscope 740. The OIS control member 730 and the gyroscope 740 are connected to the flexible printed circuit board 520 and accommodated in the hole 511 of the substrate 510. The space of the camera device 100 can be effectively used, and the miniaturized electronic device 20 can be obtained.

Figure 6B:
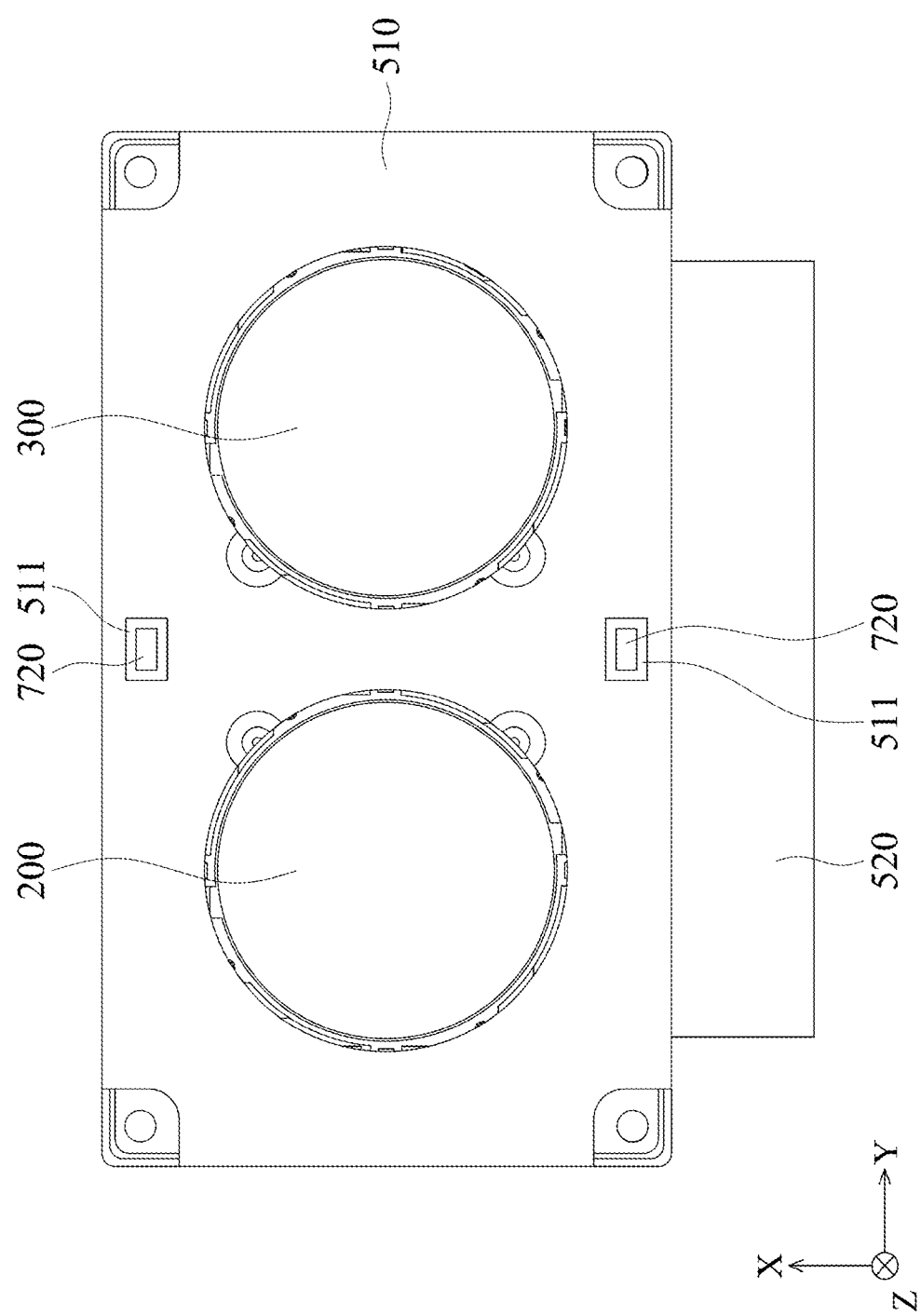
FIG. 6B is a schematic diagram of a camera device according to another embodiment of the invention.

As shown in FIG. 6B, in some embodiments, the detector 720 can be disposed between the first lens unit 200 and the second lens unit 300. Therefore, it can accurately detect the positions of the first and second lens holders 810 and 820 in the X-axis and the Y-axis.

In summary, a camera module is provided. Since a first lens unit and a second lens unit in the camera module are surrounded by a single frame, image stabilization of the first lens unit and the second lens unit can be provided by the same electromagnetic driving unit. Furthermore, the distance between two lens units can be reduced. Therefore, the processing time needed for the post-processing of the image can be reduced, the quality of the image can be enhanced, and magnetic interference can be reduced.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it is to be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. An optical member driving mechanism for connecting at least one optical member, comprising:
   a housing;
   a first holder, wherein the first holder is movable relative to the housing and configured to connect a first optical member;
   a second holder, wherein the second holder is movable relative to the housing and the first holder and configured to connect a second optical member;
   a first driving module, configured to drive the first holder to move relative to the housing;
   a second driving module, configured to drive the second holder to mover relative to the housing; and
   a circuit module, having a flexible printed circuit board, wherein the first driving module and the second driving module are electrically connected to the circuit module, wherein the circuit module has a plate structure extending along a direction which is not parallel to an optical axis of the optical member and comprises a first string portion and a second string portion respectively connected to the first holder and the second holder, and the first holder is movably connected to the second holder via the first string portion and the second string portion.

2. The optical member driving mechanism as claimed in claim 1, wherein the structure of the first string portion is substantially the same the structure of the second structure of the second string portion.

3. The optical member driving mechanism as claimed in claim 1, wherein the circuit module further comprises a fixed portion disposed between the first string portion and the second string portion.

4. The optical member driving mechanism as claimed in claim 1, wherein the first driving module comprises a first all-in-one integrated circuit and a first driving coil, the first all-in-one integrated circuit is configured to detect the relative position between the first holder and the housing and input a first control signal to control the first driving coil, wherein the circuit module is electrically connected to the first all-in-one integrated circuit.

5. The optical member driving mechanism as claimed in claim 4, wherein the second driving module comprises a second all-in-one integrated circuit and a second driving coil, the second all-in-one integrated circuit is configured to detect the relative position between the second holder and the housing and input a second control signal to control the second driving coil, wherein the circuit module is electrically connected to the second all-in-one integrated circuit.

6. The optical member driving mechanism as claimed in claim 1, wherein the circuit module comprises a longitudinal structure extending along an optical axis of the optical member.

7. The optical member driving mechanism as claimed in claim 6, wherein the circuit module further comprises a plate structure electrically connected to the flexible printed circuit board, and the plate structure extends along a direction which is not parallel to the optical axis of the optical member.

* * * * *